United States Patent [19]

Studer

[11] 4,281,850

[45] Aug. 4, 1981

[54] ANTI-SWAY APPARATUS

[76] Inventor: Frank G. Studer, Rte. 3, Box 186, Estacada, Oreg. 97023

[21] Appl. No.: 120,706

[22] Filed: Feb. 11, 1980

[51] Int. Cl.³ .............................................. B60G 19/02
[52] U.S. Cl. ..................................... 280/689; 280/6 R
[58] Field of Search ...................... 280/6 R, 6.11, 104, 280/689, 112 R

[56] References Cited

U.S. PATENT DOCUMENTS

| | | | |
|---|---|---|---|
| 1,149,617 | 8/1915 | Bick | 280/112 R |
| 2,770,468 | 11/1956 | Willingham | 280/689 |
| 3,397,895 | 8/1968 | Kuniskis | 280/6 R |
| 3,423,099 | 1/1969 | Mars | 280/6 R |
| 4,014,564 | 3/1977 | Coble | 280/689 |

*Primary Examiner*—Robert R. Song
*Attorney, Agent, or Firm*—Kolisch, Hartwell & Dickinson

[57] ABSTRACT

Anti-sway apparatus for use on a vehicle such as a car, truck, or trailer. The vehicle includes an elongated frame structure conventionally carried on a wheel-mounted support structure. The apparatus includes a rigid beam connected to one of the vehicle structures, transversely of the frame structure's long axis, for shifting angularly with the structure to which it is connected and substantially vertically with respect thereto. The beam is coupled to the other vehicle structure by an elastic belt which acts to resist angular movement, about its long axis, with respect to the support structure.

6 Claims, 6 Drawing Figures

ANTI-SWAY APPARATUS

BACKGROUND AND SUMMARY OF THE INVENTION

The present invention relates to anti-sway apparatus for use in a vehicle, and more particularly, to such apparatus employing yieldable coupling between two beams extending transversally of the vehicle's long axis.

Anti-sway devices for use on vehicles, such as trucks, trailers and the like are known in the prior art. One type of conventional prior art anti-sway apparatus employs a torsion bar which becomes torsionally loaded in response to vehicle swaying. Anti-sway apparatus of this type are generally ineffective in controlling low-angle vehicle sway. Also, the anti-sway characteristics of such apparatus are generally preset by the constructional characteristics of the torsion bar used. Further, repeated torsional bending limits the lifetime of a torsion bar, necessitating bar replacement or repair.

A general object of the present invention is to provide an anti-sway apparatus which substantially overcomes the above-named problems associated with prior art anti-sway apparatus.

More particularly, it is an object to provide anti-sway apparatus which produces a relatively large resistance to small-angle vehicle sway.

Another important object of the invention is to provide such apparatus wherein the resistance to vehicle sway can be adjusted according to vehicle load.

Still another object of the invention is to provide such apparatus which is easily mounted on a truck or trailer.

Yet another object of the invention is to provide such apparatus which is relatively maintenance free.

The anti-sway apparatus of the present invention is designed for use on a vehicle, such as a truck, trailer, or the like. The vehicle includes an elongate frame structure carried conventionally on an elongate wheel-mounted support structure. The apparatus includes a rigid beam connected to one of the vehicle structures, substantially transversally of the frame structure's long axis, for shifting angularly with the structure to which it is connected, and substantially vertically with respect thereto. The beam is yieldably coupled to the other vehicle structure for resisting angular movement of the frame structure about its long axis with respect to the support structure.

In an embodiment of the apparatus intended for use in a trailer, the rigid beam is pivotally connected to the trailer frame, for substantially vertical movement relative thereto, and for angular movement therewith. The rigid beam is yieldably coupled to the trailer axle by an elastic belt encircling the beam and the axle.

In an embodiment of the present invention designated for use in a truck having powered rear wheels, the rigid beam is connected to the truck's rear axle structure, for vertical shifting relative thereto and angular shifting therewith. Further included is a second rigid beam which is rigidly secured to the truck's frame structure, substantially transversally of its long axis. The two beams are yieldably coupled by an elastic belt.

These and other objects and features of the present invention will become more fully apparent when read in connection with the following detailed description of preferred embodiments of the invention, and the accompanying drawings, wherein.

DETAILED DESCRIPTION OF PREFERRED EMBODIMENTS OF THE INVENTION

Figure 1:
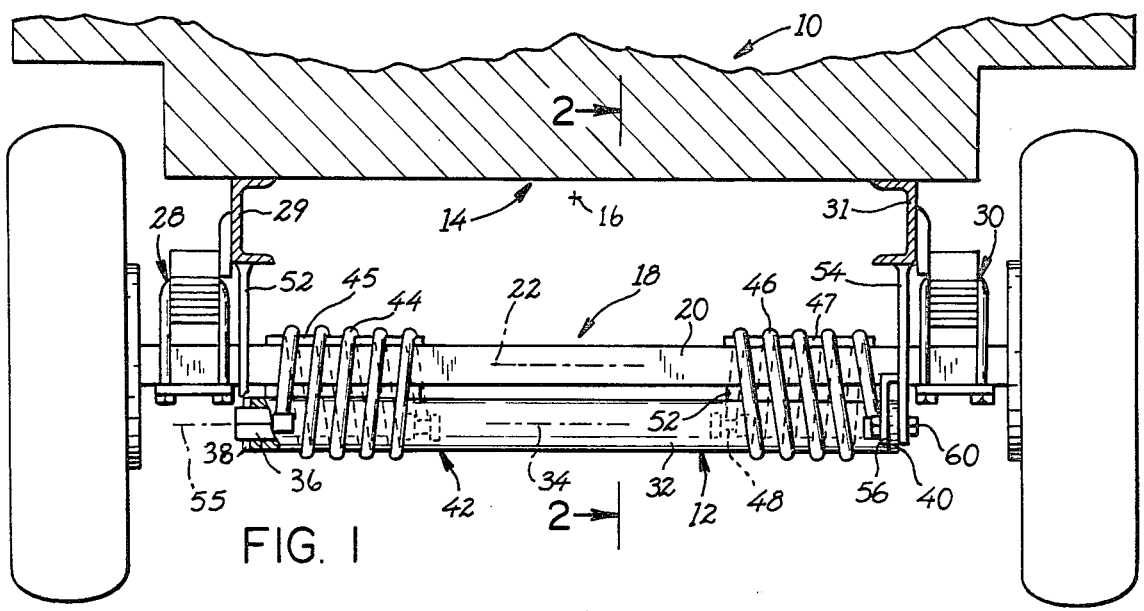
FIG. 1 is a rear view of one embodiment of the present invention, shown in opertive condition on a trailer.
Figure 2:
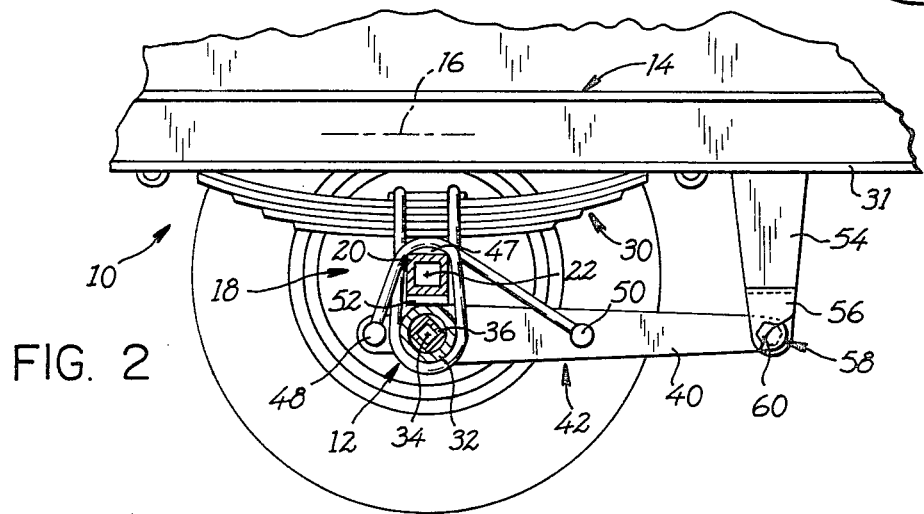
FIG. 2 is a sectional view taken along line 2—2 in FIG. 1.
Figure 3:
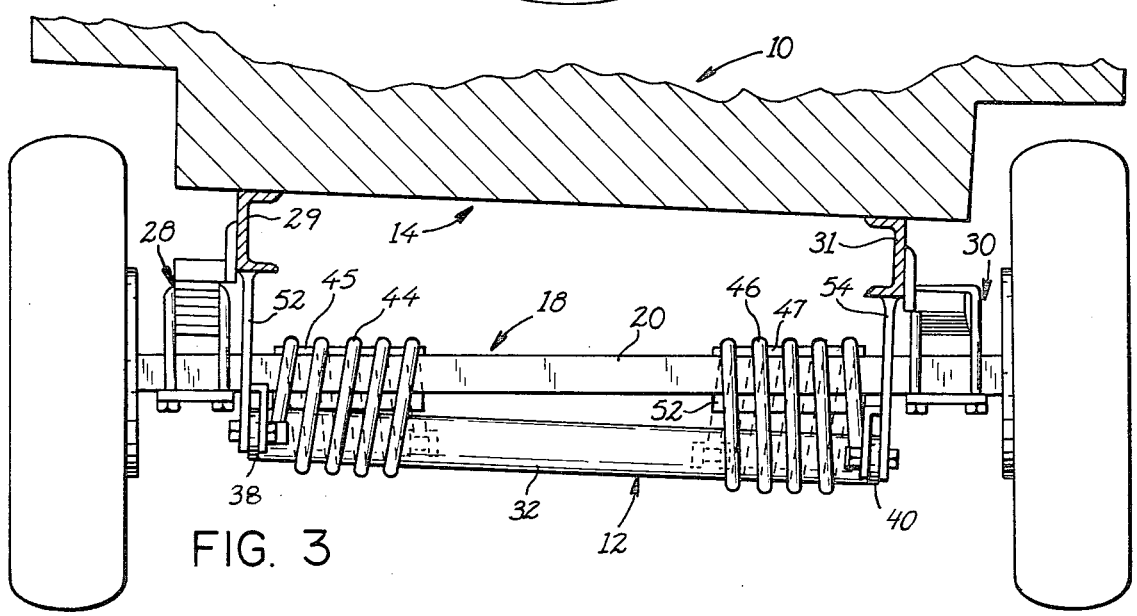
FIG. 3 is a view similar to FIG. 1, but showing the trailer in a tilted condition.

Looking now at FIGS. 1-3, there is shown generally at 10 a trailer equipped with anti-sway apparatus constructed according to one embodiment of the present invention, and indicated here generally at 12.

Trailer 10 includes a frame, or frame structure, 14 the long axis of which is indicated at 16 by a cross in FIG. 1 and by a dash-dot line in FIG. 2. A pair of beams 29, 31 extending parallel to axis 16 provide bottom structural support for the frame structure. Structure 14 is carried conventionally on a ground-traveling support structure 18 having an axle 20, the axis 22 (FIG. 1) of which extends substantially transversally of axis 16. Axle 20 is a square, hollow member (FIG. 2), with wheels rotatably mounted on its opposed ends.

Structure 14 is mounted on axle 20 through a pair of opposed leaf-spring assemblies 28, 30, which are conventional, and permit independent movement of each side of structure 14 toward and away from axle 20. Movement of each side of structure 14 substantially the same distance in the same direction produces substantially vertical relative movement between the two vehicle structures. Unequal movement of the opposite frame structure sides toward or away from axle 20 produces angular movement of the frame structure, about its long axis, with respect to the ground support structure.

Apparatus 12 generally includes a rigid beam 32 which is pivotally connected to structure 14 in a manner to be described, and yieldably coupled to axle 20, also as will be developed further. Member 32 is a hollow, cylindrical tube section (FIG. 2) whose long axis, indicated by dash-dot line 34 in FIG. 1, extends transversally of axis 16. As seen in FIG. 1, beam 32 extends substantially between assemblies 28, 30. Extending through beam 32, and rigidly mounted therein, is a hollow, square section 36 (FIG. 2), the opposed ends of which extend slightly beyond associated opposed ends of beam 32, as seen in FIG. 1.

A pair of opposed pivot arms 38, 40 are attached, as by welding, to member 32 and section 36 and project outwardly from beam 32 in the same direction. More particularly, opposed ends of section 36 extend through suitable openings in the two just-mentioned arms and are welded thereto to form a strong torque-transmitting attachment of each arm to beam 32. The unitized, U-shaped assembly including beam 32 and arms 38, 40 is indicated generally at 42. Arms 38, 40 are also referred to herebelow as elongated arm means.

Beam 32 is yieldably attached to axle 20 by a pair of elastic belts 44, 46, each of which is wound several times about left and right regions, respectively, of the beam and the axle in FIGS. 1 and 3. Considering the winding of belt 46 about the right end portions of beam 32 and axle 20 in FIG. 1, one end of the belt is secured to a clamp 48 attached to beam 32. The other belt end is secured to a clamp 50 carried on arm 40, as seen best in FIG. 2. Belt 44 is similarly secured about the opposed end regions of beam 32 and axle 20. Each belt preferably is a length of stretchable, flexible elastomeric rope. Belts 44, 46 are also referred to herebelow as tensioning means yieldably tensioning beam 32 against axle 20.

For each belt, such as belt 46, one of the securing clamps, such as clamp 50, is a conventional release clamp which may be operated between belt fastening and belt-releasing positions. To vary tension in the belts, the associated release clamps are moved to their release positions and the belts adjusted to desired tensions. The clamps are then placed in their fastening positions to hold the belts at these tensions.

Interposed between opposed end regions of axle 20 and beam 32 is a pair of spacers, such as spacer 52. Each spacer is secured, as by bolting, to the lower surface of axle 20. The spacers are generally rectangular in cross section and are coated with a self-lubricating polymeric material, such as tetrafluoroethylene polymer. As can be appreciated in FIG. 2, the spacers acts to facilitate relative sliding and rotational movement of beam 32 with respect to axle 20.

Attached to the upper surface of axle 20, where belts 44, 46 encircle the same, are a pair of cylindrical caps 45, 47. As can be appreciated in FIG. 2, these caps give the end portions of the axle a rounded upper surface, thus lessening axle "bite" against the bands.

According to an important feature of the present invention, belts 44, 46 are wound under tension to produce a biasing of beam 32 firmly against spacers, such as spacer 52, carried on the axle. At the same time, each band is stretchable to accommodate movement of an end portion of beam 32 angularly away from axle 20, as illustrated in FIG. 3, and as will be described below. Slight rotational movement of beam 32 about axis 34, with respect to axle 20, is accommodated by stretching of the windings of belts 44, 46. That is, during beam rotation the portions of belts 44, 46 encircling the beam "rid3" with the beam, rather than slip relative thereto. This prevents the belts from being worn by constant rubbing.

With reference to FIG. 1, a pair of posts 52, 54 are attached, as by welding, to beams 29, 31, respectively, and extend downwardly therefrom. Attached to post 54 is a downwardly projecting ear 56, forming therewith a downwardly facing channel 58. This channel is dimensioned to receive movably but somewhat snugly therebetween, the right end region of arm 40 in FIG. 2. Arm 40 is pivotally connected to post 54 by a nut-and-bolt combination indicated at 60. While not shown here a bushing interposed coaxially between the attaching bolt and arm 40, within channel 58, serves as a channel spacer, and also acts to protect the bolt against wear. Arm 38 is similarly attached to post 52. Thus, assembly 42 is mounted on frame 14 for pivoting with respect thereto about an axis paralleling beam 32 and extending through lower end regions of posts 52, 54, and for angular movement with frame 14 about the longitudinal axis of the frame.

Operation apparatus 12 will now be described. As noted above, structure 14 is mounted on axle 20 in a manner which permits either substantially vertical or side-to-side frame structure movement with respect to structure 18. Vertical frame structure movement produces pivoting of arms 38, 40 relative to posts 52, 54, respectively, and rotation of beam 32 about axis 34, as noted above. Here apparatus 12 is essentially passive, having little effect on the suspension characteristics of the vehicle.

FIG. 3 illustrates the configuration of apparatus 12 during vehicle sway, such as might occur when the vehicle rounds a curve, or is buffeted by winds. As posts 52, 54 shift angularly with structure 14, rigid angular coupling between the posts and beam 32, detailed above, causes beam 32 to shift angularly with respect to axle 20. Such angular movement is resisted by belts 44, 46. The extent of resistance provided by these bands is related, of course, to the extent of relative angular shifting between the axle and the beam. As noted above, belts 44, 46 may be wound to a selected tension about the axle and beam, to adjust the anti-sway characteristics of vehicle according to vehicle load or anticipated road or weather conditions affecting vehicle sway.

Figure 4:
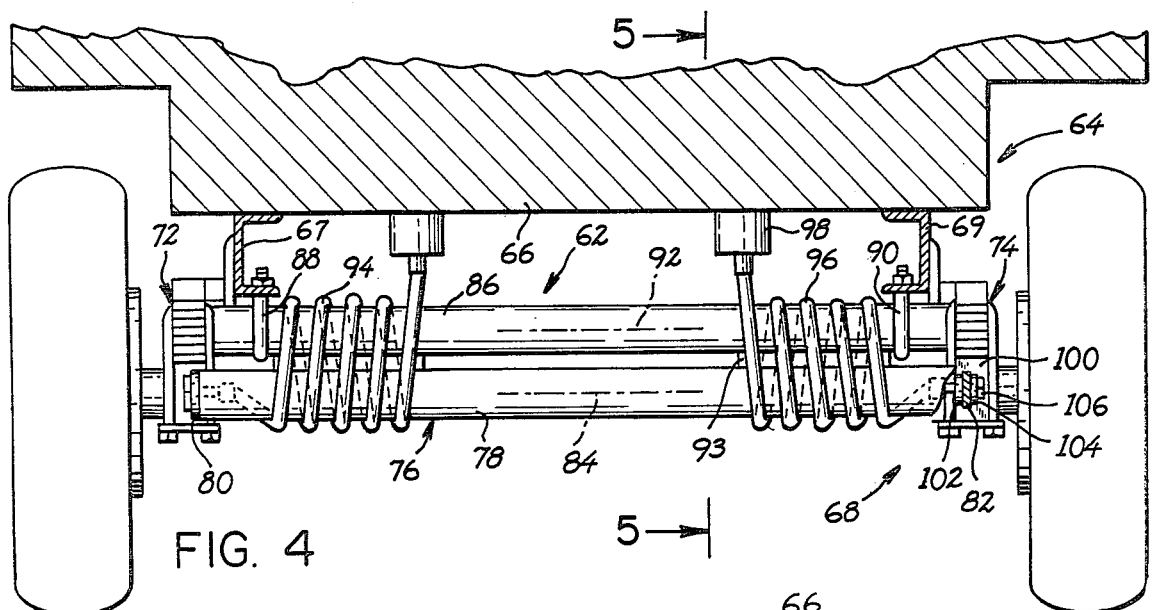
FIG. 4 is a rear view of a second embodiment of the present invention, shown in operative condition on a truck.
Figure 5:
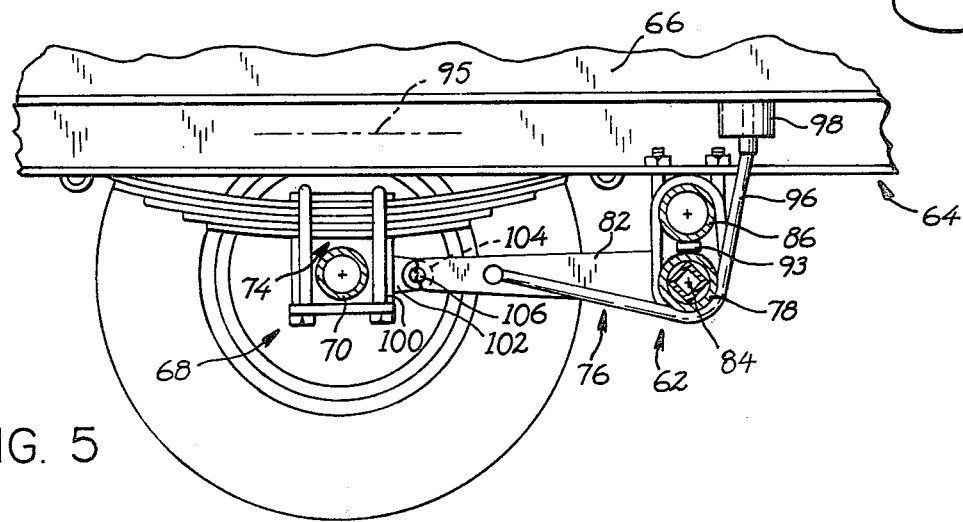
FIG. 5 is a sectional view taken generally along line 5—5 in FIG. 4.
Figure 6:
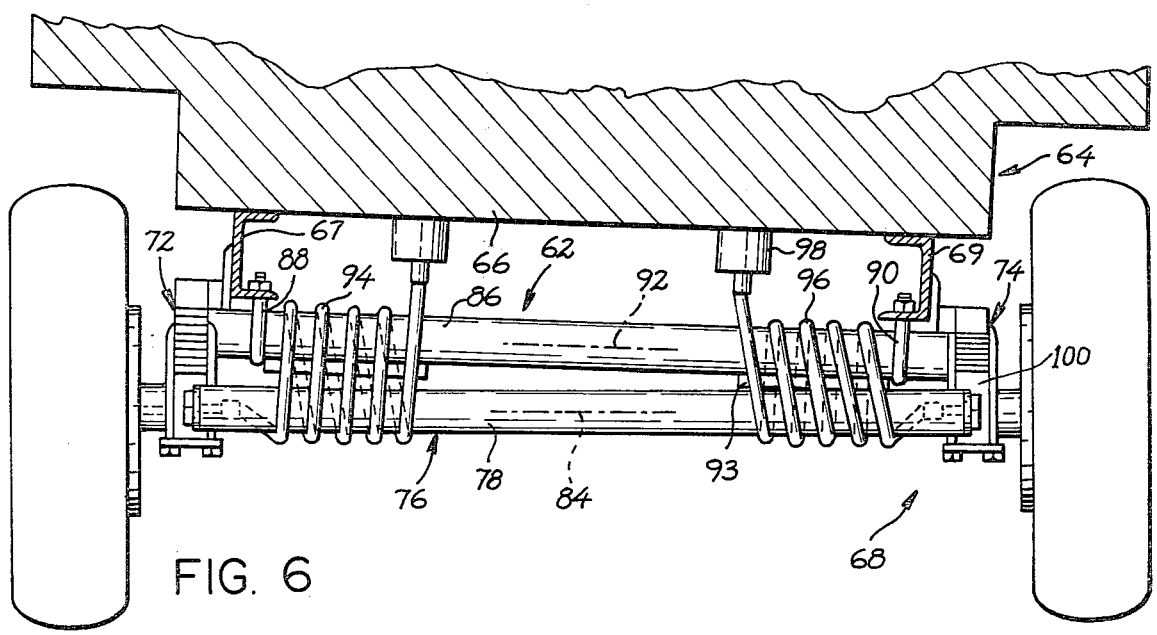
FIG. 6 is a view similar to FIG. 4, but showing the truck in a tilted condition.

In FIGS. 4–6, there is shown at 62 a second embodiment of the present invention designed for use for preventing sway in a powered vehicle, such as a truck shown fragmentarily at 64. Truck 64 includes a frame structure 66, and a ground traveling support structure 68. The latter structure forms a rear portion of the chassis of the truck and includes, conventionally, a transaxle, or powered rear axle 70 (FIG. 5) to which a pair of wheels are rotatably and drivingly attached. Structure 66 which is supported by a pair of beams 67, 69, is mounted on structure 68 conventionally, by a pair of opposed leaf-spring assemblies 72, 74. These assemblies are conventional and similar to assemblies 28, 30 employed in trailer 10. Structure 66 may shift substantially vertically or angularly, about its long axis, with respect to structure 68, similar to the above-described movement of structure 14 with respect to structure 18.

Apparatus 62 includes a beam assembly 76 which is substantially identical in construction to the above-described assembly 42. Specifically, structure 76 includes a rigid beam 78 having secured, at its opposed ends, a pair of pivot arms 80, 82 which are secured to the beam, in part, by welded attachment to a square tubular beam carried within beam 78. Arms 80, 82 are also referred to herein as elongate arm means. The long axis of beam 78 is indicated by dash-dot line 84 in FIGS. 4 and 6.

Apparatus 62 includes a second rigid beam, indicated in the figures at 86. Beam 86 is rigidly secured, adjacent its opposed ends, to beams 67, 69, by U-bolts 88, 90, respectively. Thus mounted, beam 86 extends transversally of structure 66, with the beam's long axis, indicated at dash-dot line 92 in FIGS. 4 and 6 being orthogonal, and fixed with respect to the vehicle's long axis 95 (FIG. 5).

Beams 78, 86 are spaced apart by a pair of spacers, such as spacer 93, having flat, self-lubricating upper and lower surfaces, similar to above-described spacer 52. The spacers, which are rigidly secured to beam 86, as by bolting, allow relative sliding and rotational movement of beam 78 with respect to beam 86. A pair of elastic belts 94, 96, similar to above-described belts 44, 46, are wrapped about left and right end portions of the two beams, respectively, in FIGS. 4 and 6, providing tensioning means for tensioning beam 78 against beam 86. Belt 96 is secured at one end to a clamp 98 carried on the lower surface of structure 66, and at its other end, to a release clamp 99 carried on the associated pivot arm. Belt 94 is similarly secured to the left end region of apparatus 62 in FIGS. 4 and 6. Tension in the belts, such as belt 94, is adjustable by operation of the release clamp, such as clamp 99, similar to the belt-tension adjustment described with reference to apparatus 12.

Limited rotational movement of beam 78, relative to beam 86, is accommodated by stretching of bands 94, 96, similar to that described with reference to beam 32 in apparatus 12. Angular movement of beam 78 with respect to beam 86, i.e. movement which carries axis 84 out of parallelism with axis 92, is accommodated, and yieldably resisted, by bands 94, 96, also similar to what has been described with reference to apparatus 12.

Looking now at the pivot connection between assembly 76 and structure 68, with particular reference to FIG. 5, each assembly includes a rearwardly facing plate, such as plate 100 in assembly 74. A pair of ears, such as ears 102, 104 (FIG. 5) projecting rearwardly (toward the right in FIG. 5) from plate 100 are dimensioned to receive slidably, but snugly, therein an end portion of an associated pivot arm, such as arm 82. Arm 82 is pivotally connected to plate 100 by a nut-and-bolt combination 106 extending through the two plate ears and the end left region of the arm in FIG. 5. A bushing (not shown) interposed coaxially between the attaching bolt and arm 82 provides a spacer between ears 102, 104 and serves to prevent wear on the bolt. Arm 80 is similarly connected pivotally to assembly 72.

It can be appreciated that the just-described pivotal connection between assembly 76 and structure 68 acts to maintain beam 78 parallel to axle 70, while permitting pivotal movement of assembly 76 with respect to structure 68 about an axis paralleling the two beams.

The operation of apparatus 62, which is similar to that of apparatus 12, can now be appreciated. Truck movement producing substantially vertical movement of structure 66 with respect to structure 68, is accommodated, in apparatus 62, by rotation of beam 78 with respect to beam 86, as assembly 76 pivots with respect to the vehicle support structure. Here, as in apparatus 12, vehicle suspension is substantially unaffected by apparatus 62.

When structure 66 tilts with respect to the ground-support structure, beam 86, which is attached to structure 66 for angular movement therewith shifts relative to the ground-support structure, as indicated in FIG. 6. Beam 78, by virtue of its above-described connection to the ground-support structure, remains substantially parallel to the support structure's axle. Beam 86 thus shifts angularly with respect to beam 78, with such being yieldably resisted by the two belts encircling the beams.

From the foregoing, it is seen that each apparatus 12, 62 provide a rigid beam which is connected to one of two associated vehicle structures for substantially vertical shifting relative thereto, and for angular shifting therewith. In apparatus 12, the beam is so connected to the vehicle frame structure, and in apparatus 62, to the ground-support structure. In each apparatus, the rigid beam is coupled to the other of the two vehicle structures, for executing slight relative rotational movement relative thereto, and for yieldably resisting angular movement therebetween.

It can be appreciated how stated objects of the present invention are met in both embodiments of the invention. First, each apparatus is designed to restrict vehicle swaying, and particularly, to control small-angle swaying. Resistance to small-angle swaying is achieved by sufficiently tensioning the elastic belts coupling the beam to the associated vehicle structure, when the vehicle is in a non-swayed position. Secondly, the tension in the bands can be adjusted easily and selectively, to achieve suitable anti-sway characteristics to match the vehicle load. To prevent invention is adaptable for use either in a trailer or a power-driven vehicle. Finally the invention obviates problems of metal fatigue associated with prior art anti-sway apparatus.

While preferred embodiments of the invention have been described herein, various changes and modifications may be made without departing from the spirit of the invention.

It is claimed and desired to secure by Letters Patent:

1. Anti-sway apparatus in a vehicle which includes an elongate frame structure and a ground-traveling support structure having an axle which extends transversely of the longitudinal axis of the frame structure, where the frame structure is mounted on the support structure axle for substantially vertical movement toward and away therefrom, and for angular movement about its longitudinal axis with respect to the support structure axle, said apparatus comprising
   a rigid beam positioned below said frame structure and extending transversely of the longitudinal axis thereof,
   elongate arm means joined at one of its ends to said beam and connected at its other end to one of said structures for pivoting with respect thereto about an axis paralleling said beam, and
   tensioning means yieldably tensioning said beam against the other of said structures to resist angular movement of said beam, with respect to said other structure, about the longitudinal axis of the frame structure.

2. The apparatus of claim 1, wherein said elongate arm means includes a pair of elongate pivot arms which are rigidly attached adjacent one set of their ends to opposed end regions of said beam, and pivotally attached adjacent their opposite set of ends to said one structure.

3. The apparatus of claim 2 which further includes a second rigid beam secured to said frame structure, extending substantially transversely of the longitudinal axis thereof, and wherein said pivot arms are pivotally connected to said support structure, and said tensioning means includes elastic belt means encircling said two beams.

4. The apparatus of claim 3, wherein said tensioning means is adjustable to vary the tension in said belt means.

5. The apparatus of claim 2, wherein said pivot arms are pivotally connected to said frame structure, and said tensioning means includes elastic belt means encircling said beam and said axle.

6. The apparatus of claim 5, wherein said tensioning means is adjustable to vary the tension in said belt means.

* * * * *